(No Model.) 4 Sheets—Sheet 1.

G. F. GALLAGHER & T. B. MOORE.
FURNACE.

No. 414,150. Patented Oct. 29, 1889.

Witnesses:
Otto Hoddick
James A. Jarrett

Inventors
George F. Gallagher
Thomas B. Moore
By W. T. Miller
Attorney.

(No Model.) 4 Sheets—Sheet 2.

G. F. GALLAGHER & T. B. MOORE.
FURNACE.

No. 414,150. Patented Oct. 29, 1889.

Witnesses:
Otto Hoddick
James A. Jarrett

Inventors
George F. Gallagher
Thomas B. Moore
By W. F. Miller
Attorney.

N. PETERS, Photo-Lithographer, Washington, D. C.

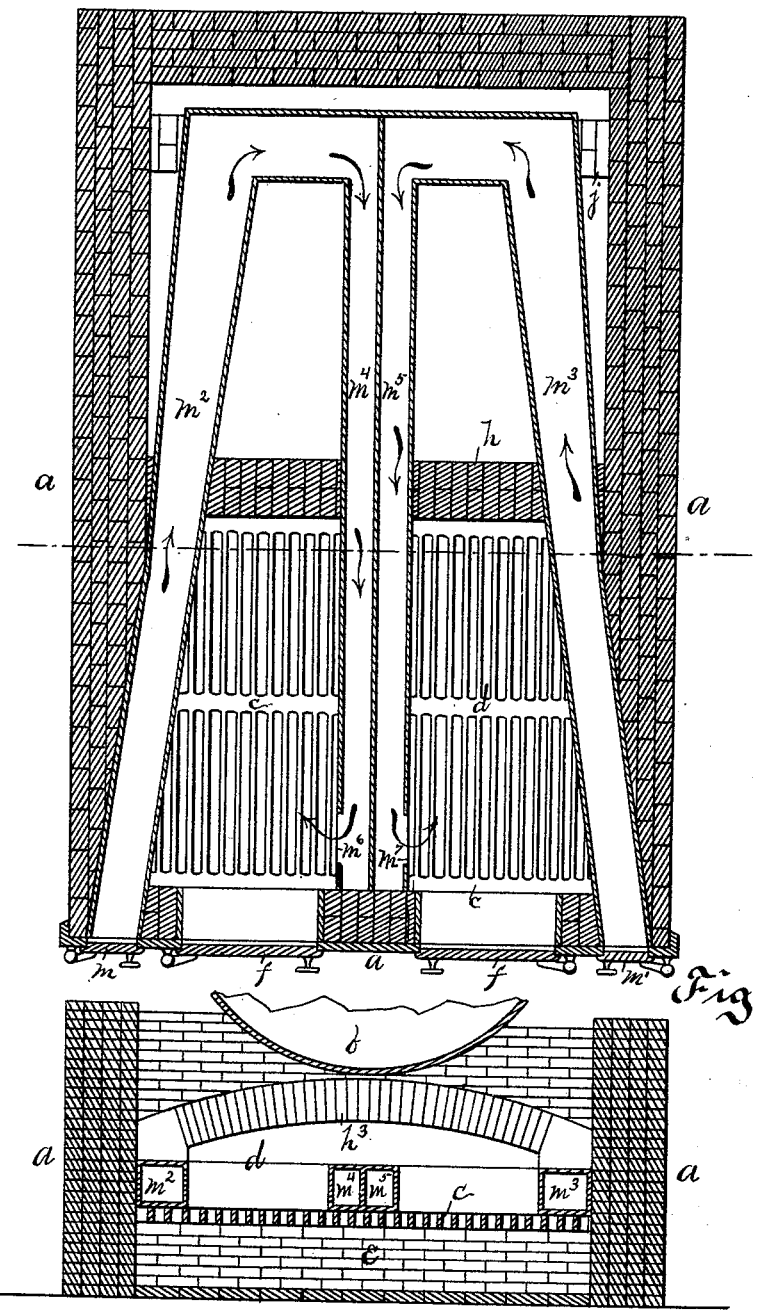

(No Model.) 4 Sheets—Sheet 4.

G. F. GALLAGHER & T. B. MOORE.
FURNACE.

No. 414,150. Patented Oct. 29, 1889.

Witnesses:
Otto Hoddick.
James A. Jarrett.

Inventors
George F. Gallagher
Thomas B. Moore
By W. T. Miller
Attorney.

UNITED STATES PATENT OFFICE.

GEORGE F. GALLAGHER AND THOMAS B. MOORE, OF ROCHESTER, NEW YORK, ASSIGNORS OF ONE-THIRD TO HENRY GALLAGHER, OF SAME PLACE.

FURNACE.

SPECIFICATION forming part of Letters Patent No. 414,150, dated October 29, 1889.

Application filed January 15, 1889. Serial No. 296,408. (No model.)

*To all whom it may concern:*

Be it known that we, GEORGE F. GALLAGHER and THOMAS B. MOORE, citizens of the United States, residing at Rochester, in the county of Monroe and State of New York, have invented certain new and useful Improvements in Furnaces; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to certain improvements in that class of furnaces for consuming smoke for which Letters Patent No. 391,310 were granted October 16, 1888, to George F. Gallagher. In that furnace passages were provided for conducting air from the outside to the rear of the fire-box and discharging it in a heated state into the fire-box.

Our present improvement consists in extending these passages beyond the fire-box to the rear of the combustion-chamber, and from thence to and into the fire-box, where the heated air is discharged. We will now proceed to definitely describe the manner in which our invention is carried out.

Figure 1:
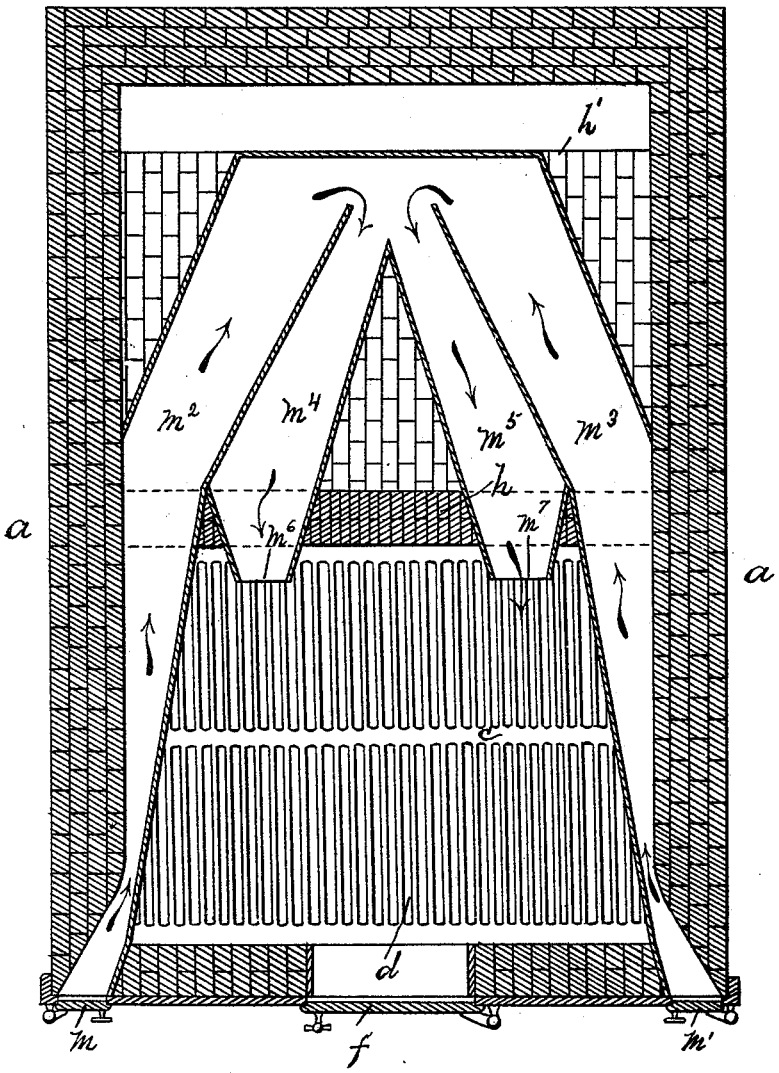
Figure 2:
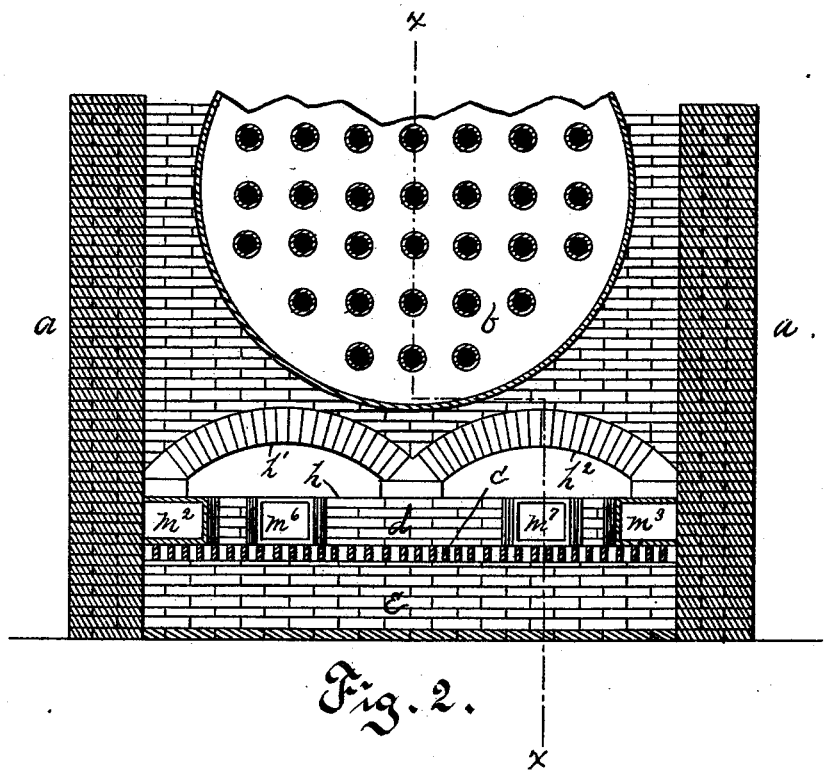
Figure 3:
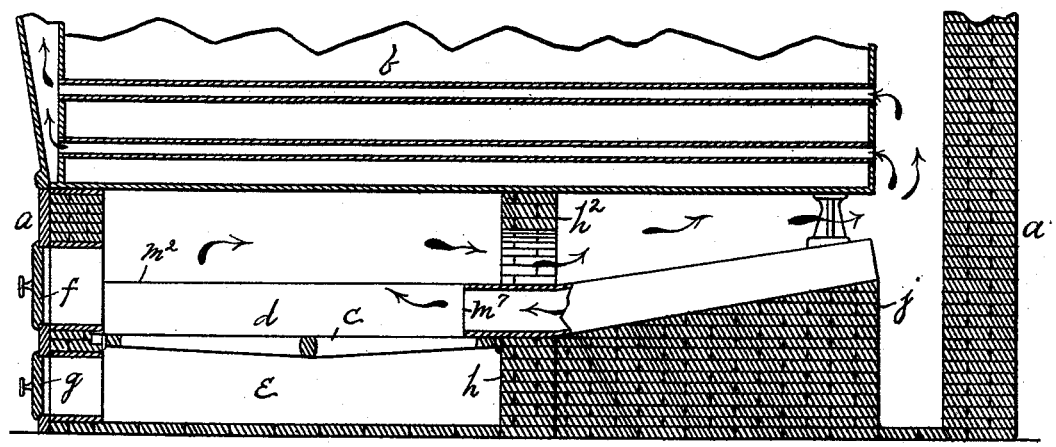
Figure 6:
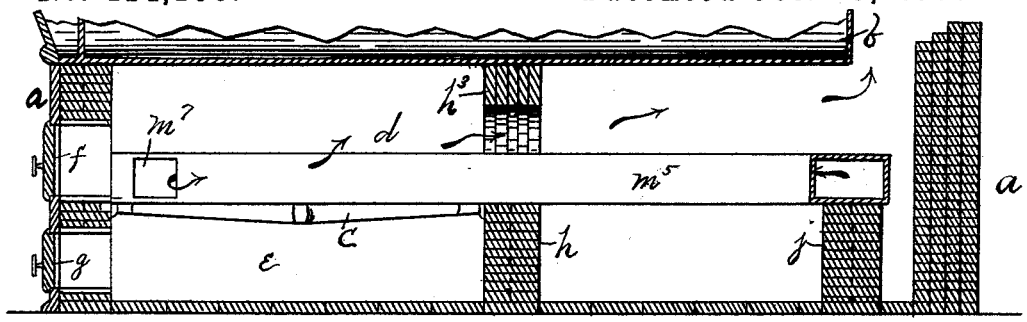
Figure 7:
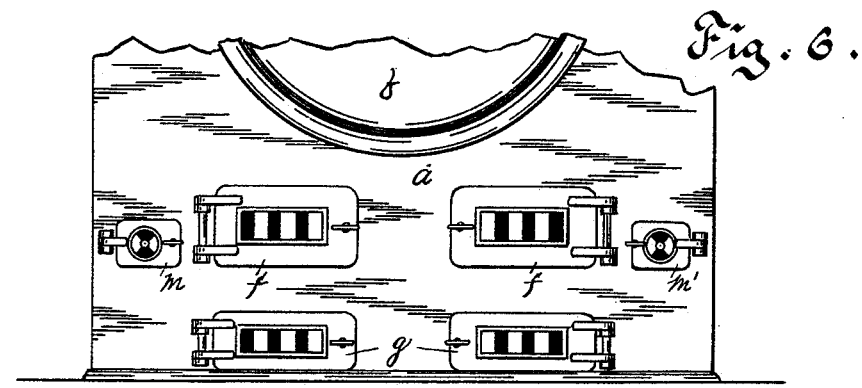
Figure 8:
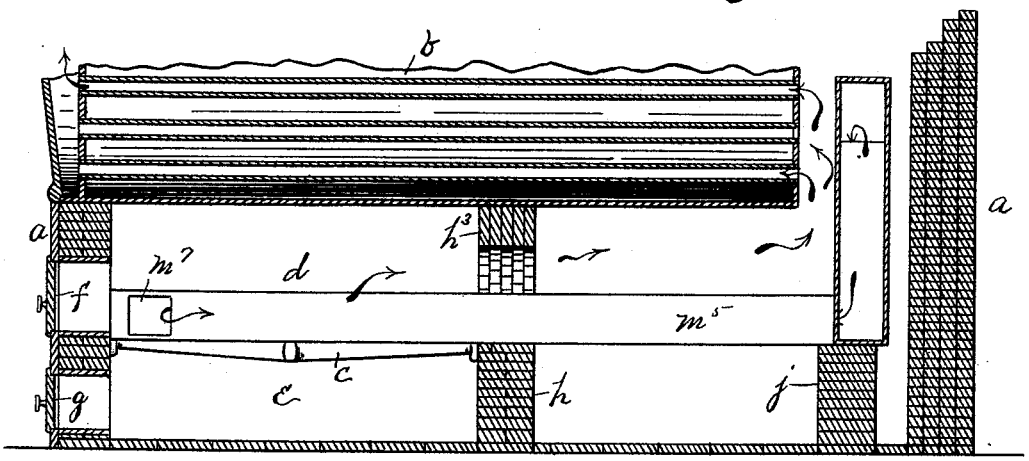

In the drawings, Figure 1 is a horizontal section, Fig. 2 is a vertical transverse section, and Fig. 3 is a vertical longitudinal section, (taken in line $x\ x$ of Fig. 2,) of one form of our improved furnace, showing the heated air discharged at the rear of the fire-box. Figs. 4, 5, and 6 are similar views of our improved furnace, showing the heated air discharged at the front of the fire-box. Fig. 7 shows a front elevation of our furnace, and Fig. 8 is a vertical longitudinal section of a modification.

Referring to the drawings, $a\ a$ are the walls of the furnace, and $b$ the boiler. $c$ are the grate-bars, $d$ the fire-box, and $e$ the ash-pit. $f$ is the door to the fire-box, and $g\ g$ are the ash-pit doors, the arrangement so far described being of old and well-known construction. Over the bridge-wall $h$ we have arranged two arches $h'\ h^2$, (see Fig. 3,) which serve to retard the particles of combustion, so as to more effectually consume them before passing out through the boiler.

At either side of the front of the furnace are the doors $m\ m'$, leading, respectively, into the passages $m^2\ m^3$. These passages $m^2\ m^3$ are arranged along the side wall of the fire-box, and, passing through the bridge-wall $h$, extend to the rear of the combustion-chamber, where they are connected to the return-passages $m^4\ m^5$, which lead to the rear of the fire-box passing through the bridge-wall $h$. The air which is conducted through the passages from the doors $m\ m'$ is highly heated and discharged into the fire-box at the openings $m^6\ m^7$. In this arrangement we have shown the air-passages applied to a furnace having its combustion-chamber bricked in, as in Figs. 1 and 2, in which the air-passages rest upon the bricked-in portion or pier $h'$.

In Figs. 4, 5, and 6 we have shown our improved arrangement as applied to a furnace in which the combustion-chamber is not bricked in. In this instance the heating-passages $m^2\ m^3$ extend along the sides of the fire-box and back to the rear of the combustion-chamber, there resting upon a bridge or pier $j$, and returning pass through the center of the furnace to the front of the fire-box, where the highly-heated air is discharged, as at $m^6\ m^7$. (See Fig. 4.) In this construction we have shown but a single arch $h^3$, as will be seen in Fig. 5, to take the place of the double arch shown in Fig. 3.

In Fig. 8 we have shown another modified form, in which the passages are arranged to conduct the cold air from the outside at the doors $m\ m'$, after leading it to the rear of the combustion-chamber, up between the back walls of the boiler and combustion-chamber, and then passing down and to the front of the fire-box, as in Fig. 4.

It will be seen that with our improved furnace we are enabled to take up and utilize the heat of the combustion-chamber (which for this purpose would otherwise be wasted) in a manner to materially assist in the perfect consumption of all the products of combustion.

We claim—

A furnace provided with the usual fire-box, ash-pit, and combustion-chamber, and having air-passages extending through the fire-box and combustion-chamber to the rear vertical flue or passage for conducting air from the outside to the rear of the combustion-chamber and thence to the fire-box, where it is discharged either at the front or back in a highly-heated state, substantially as and for the purpose stated.

In testimony whereof we have signed our names to this specification in the presence of two subscribing witnesses.

GEORGE F. GALLAGHER.
THOMAS B. MOORE.

Witnesses:
W. T. MILLER,
OTTO HODDICK.